United States Patent
Yu et al.

(10) Patent No.: US 10,825,347 B2
(45) Date of Patent: Nov. 3, 2020

(54) UNMANNED AIRCRAFT, AND METHOD AND SYSTEM FOR NAVIGATION

(71) Applicant: SZ DJI TECHNOLOGY CO., LTD., Shenzhen (CN)

(72) Inventors: Yun Yu, Shenzhen (CN); Jianyu Song, Shenzhen (CN); Guoxiu Pan, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 247 days.

(21) Appl. No.: 15/979,919

(22) Filed: May 15, 2018

(65) Prior Publication Data

US 2018/0261108 A1   Sep. 13, 2018

Related U.S. Application Data

(63) Continuation of application No. PCT/CN2015/094914, filed on Nov. 18, 2015.

(51) Int. Cl.
*G08G 5/00* (2006.01)
*G01S 19/47* (2010.01)
(Continued)

(52) U.S. Cl.
CPC ......... *G08G 5/0069* (2013.01); *B64C 39/024* (2013.01); *G01C 21/12* (2013.01);
(Continued)

(58) Field of Classification Search
CPC . B64C 2201/141; B64C 39/024; G01C 21/12; G01C 21/165; G01S 19/423;
(Continued)

(56) References Cited

U.S. PATENT DOCUMENTS

| 4,644,538 A | 2/1987 | Cooper et al. |
| 5,590,044 A * | 12/1996 | Buckreub ............ G01C 21/165 342/195 |

(Continued)

FOREIGN PATENT DOCUMENTS

| CN | 203191557 U | 9/2013 |
| CN | 103529692 A | 1/2014 |

(Continued)

OTHER PUBLICATIONS

The World Intellectual Property Organization (WIPO) International Search Report for PCT/CN2015/094914 dated Aug. 17, 2016 8 Pages (including translation).

(Continued)

*Primary Examiner* — Babar Sarwar
(74) *Attorney, Agent, or Firm* — Anova Law Group, PLLC

(57) ABSTRACT

An unmanned aircraft navigation system includes a master navigation device, a slave navigation device, and a controller. The master navigation device includes at least one measurement component. The slave navigation device includes at least one measurement component configured to provide a redundancy support for the at least one measurement component of the master navigation device. The controller is configured to effect a navigation using the at least one measurement component of the master navigation device and the at least one measurement component of the slave navigation device.

20 Claims, 7 Drawing Sheets

Controller receives data from each measurement component of the master navigation device and the slave navigation device — 1401

Controller effects a navigation using the received data measured by each measurement component — 1402

(51) Int. Cl.
  *G01C 21/16* (2006.01)
  *G01S 19/49* (2010.01)
  *G05D 1/00* (2006.01)
  *B64C 39/02* (2006.01)
  *G01C 21/12* (2006.01)
  *G01S 19/42* (2010.01)

(52) U.S. Cl.
  CPC ............ *G01C 21/165* (2013.01); *G01S 19/47* (2013.01); *G01S 19/49* (2013.01); *G05D 1/0077* (2013.01); *B64C 2201/141* (2013.01); *G01S 19/423* (2013.01)

(58) Field of Classification Search
  CPC ....... G01S 19/47; G01S 19/49; G05D 1/0077; G08G 5/0069
  See application file for complete search history.

(56) References Cited

U.S. PATENT DOCUMENTS

| | | | | |
|---|---|---|---|---|
| 5,929,805 | A * | 7/1999 | Tadros | G01S 19/54 342/357.27 |
| 6,377,892 | B1 * | 4/2002 | Johnson | G01C 21/00 342/357.31 |
| 8,660,715 | B2 * | 2/2014 | Nicolas | G08G 5/0039 701/3 |
| 2005/0043934 | A1 | 2/2005 | Hartmann et al. | |
| 2012/0173052 | A1 * | 7/2012 | Nicolas | G05D 1/0077 701/3 |
| 2015/0362598 | A1 * | 12/2015 | Rollet | G01C 21/20 701/17 |
| 2016/0378108 | A1 * | 12/2016 | Paczan | G06Q 10/083 705/330 |
| 2017/0144757 | A1 * | 5/2017 | Hall | G05D 1/0022 |
| 2018/0134383 | A1 * | 5/2018 | Schulz | B64C 27/08 |

FOREIGN PATENT DOCUMENTS

| | | |
|---|---|---|
| CN | 104180803 A | 12/2014 |
| CN | 204556838 U | 8/2015 |
| CN | 104914872 A | 9/2015 |
| CN | 204925802 U | 12/2015 |
| CN | 205120971 U | 3/2016 |
| CN | 205246884 U | 5/2016 |
| CN | 205247212 U | 5/2016 |
| CN | 205333865 U | 6/2016 |

OTHER PUBLICATIONS

Li Zhou et al., Satellite Navigation Positioning and Beidou System Application, GNSS LBS and BeiDou System Applications, p. 67, Sep. 2015, Surveying and Mapping Publishing House, Beijing, China.(Machine Translation Included).

* cited by examiner

UNMANNED AIRCRAFT, AND METHOD AND SYSTEM FOR NAVIGATION

CROSS-REFERENCE TO RELATED APPLICATION

This application is a continuation of International Application No. PCT/CN2015/094914, filed on Nov. 18, 2015, the entire contents of which are incorporated herein by reference.

TECHNICAL FIELD

The disclosure can be directed to unmanned aerial vehicle, more particularly to an unmanned aircraft, and a method and system for navigation.

BACKGROUND OF THE DISCLOSURE

Unmanned Aerial Vehicles (UAVs), also known as drones, are unmanned aircrafts manipulated by wireless remote control devices and onboard program-controlled devices. UAVs are low cost, maneuverable and easy to operate; therefore, UAVs have been widely used in various fields including military and civil applications.

An unmanned aircraft's operation may rely on precise navigation information. There can be a need to improve the navigation system of the unmanned aircraft.

SUMMARY OF THE DISCLOSURE

The disclosure provide a redundant topological configuration to effect a redundant control mechanism of the unmanned aircraft. A precision in navigation and a reliability in flight can be improved.

A first aspect of the disclosure provides a navigation system of an unmanned aircraft. The navigation system can comprise a controller and at least one measurement component, the controller being connected to each one of the at least one measurement component. In some embodiments, the at least one measurement component can comprise redundant sensors and provides data measured by the sensor to the controller.

In some embodiments, a data communication between the at least one measurement component and the controller can be effected via a serial communication bus.

In some embodiments, the data communication between the at least one measurement component and the control can be effected via a Controller Area Network (CAN) communication bus.

In some embodiments, at least one measurement component from among the at least one measurement component can be an inertia measurement component.

In some embodiments, the inertial measurement component can comprise an acceleration sensor and/or a gyro sensor.

In some embodiments, the inertia measurement component can be embedded in the controller.

In some embodiments, a data communication between the inertia measurement component and the controller can be effected via a serial interface.

In some embodiments, a data communication between the inertia measurement component and remaining measurement component(s) in the navigation system can be effected via a serial communication bus.

In some embodiments, a data communication between the inertial measurement component and remaining measurement component(s) in the navigation system can be effected via a CAN communication bus.

In some embodiments, the at least one measurement component can be a positioning component, the positioning component being configured to calculate a geographical position of the unmanned aircraft.

In some embodiments, the positioning component can comprise a positioning sensor.

In some embodiments, the positioning sensor can comprise any one or a combination of a GPS sensor or a BeiDou positioning sensor.

In some embodiments, the at least one measurement component can be a magnetic sensing component, the magnetic sensing component being configured to sense a geomagnetic field to determine a direction.

In some embodiments, the magnetic sensing component can comprise a compass sensor.

In some embodiments, the system further can comprise a visual component which is connected to the controller.

In some embodiments, the visual component can be a monocular component or a binocular component.

In some embodiments, the system can further comprise a carrier signal differential component which is connected to the controller.

A second aspect of the disclosure provides an unmanned aircraft. The unmanned aircraft can comprise the navigation system of an unmanned aircraft of the first aspect of the disclosure.

A third aspect of the disclosure provides a method for navigation of an unmanned aircraft. The method can comprise receiving, by a controller, data from a measurement component, at least one measurement component comprising redundant sensors and providing data measured by the sensor to the controller; and effecting, by the controller, a navigation based upon the received data.

In some embodiments, when the data from the at least one measurement component comprises data measured by each sensor, the process of effecting, by the controller, a navigation based upon the received data can comprise selecting, by the controller, data measured by a sensor in an optimal operation state, from among the data received from the at least one measurement component, and effecting a navigation using the selected data and data from other measurement component(s).

In some embodiments, when the data from the at least one measurement component comprises data measured by each sensor, the process of effecting, by the controller, a navigation based upon the received data can comprises selecting, by the controller, data measured by a sensor in a stable operation state, from among the data received from the at least one measurement component, and effecting a navigation using the selected data and data from other measurement component(s).

In some embodiments, the data from the at least one measurement component can comprise data measured by a sensor in an optimal operation state, or data measured by a sensor in a most stable operation state. In some embodiments, the process of effecting, by the controller, a navigation based upon the received data can comprise effecting, by the controller, a navigation based upon data from each measurement component.

In some embodiments, a data communication between the controller and the measurement component can be effected via a serial communication bus.

In some embodiments, the data communication between the controller and the measurement components can be effected via a CAN communication bus.

In some embodiments, the data received from a measurement component can comprise data from an inertia measurement component. In some embodiments, a navigation can be effected based upon the data from the inertia measurement component.

In some embodiments, the inertial measurement component can comprise an acceleration sensor and/or a gyro sensor.

In some embodiments, a data communication between the controller and the inertia measurement component can be effected via a serial interface.

In some embodiments, the data received from a measurement component can comprise data from a positioning component. In some embodiments, a navigation can be effected based upon the data from the positioning component.

In some embodiments, the positioning component can comprise a positioning sensor.

In some embodiments, the positioning sensor can comprise any one or a combination of a GPS sensor or a BeiDou positioning sensor.

In some embodiments, the data received from a measurement component can comprise data from a magnetic sensing component. In some embodiments, a navigation can be effected based upon the data from the magnetic sensing component.

In some embodiments, the magnetic sensing component can comprise a compass sensor.

In some embodiments, the data received from a measurement component can comprise data from a visual component. In some embodiments, a navigation can be effected based upon the data from the visual component.

In some embodiments, the visual component can comprise a monocular component or a binocular component.

In some embodiments, the data received from a measurement component can comprise data from a carrier signal differential component. In some embodiments, a navigation can be effected based upon the data from the carrier signal differential component.

A fourth aspect of the disclosure provides a navigation system of an unmanned aircraft. The navigation system can comprise a master navigation device, a slave navigation device and a controller. In some embodiments, the master navigation device can comprise at least one measurement component. In some embodiments, the slave navigation device can comprise at least one measurement component, and the at least one measurement component of the slave navigation device providing a redundancy support for the at least one measurement component of the master navigation device. In some embodiments, the controller can be configured to effect a navigation using the at least one measurement component of the master navigation device and the at least one measurement component of the slave navigation device which provides a redundancy support for the at least one measurement component of the master navigation device.

In some embodiments, a data communication between the at least one measurement component of the master navigation device and the at least one measurement component of the slave navigation device and the controller can be effected via a serial communication bus.

In some embodiments, a data communication between the at least one measurement component of the master navigation device and the at least one measurement component of the slave navigation device and the controller can be effected via a CAN communication bus.

In some embodiments, the controller can be configured to select one measurement component with respect to each type of measurement component from the master navigation device and the slave navigation device to effect a navigation.

In some embodiments, the controller can be configured to select one measurement component in an optimal operation state with respect to each type of measurement component from the master navigation device and the slave navigation device to effect a navigation.

In some embodiments, the controller can be configured to select one measurement component in a most stable operation state with respect to each type of measurement component from the master navigation device and the slave navigation device to effect a navigation.

In some embodiments, the master navigation device can comprise one inertial measurement component, one positioning component, one magnetic sensing component or a combination thereof. In some embodiments, the slave navigation device can comprise at least one inertial measurement component, at least one positioning component, at least one magnetic sensing component or a combination thereof.

In some embodiments, the master navigation device can comprise one inertial measurement component, one positioning component and one magnetic sensing component. In some embodiments, the slave navigation device can comprise two inertia measurement components, two positioning components and two magnetic sensing components.

In some embodiments, the master navigation device can comprise an inertial measurement component which is embedded in the controller.

In some embodiments, the slave navigation device can comprise at least one inertial measurement component, and In some embodiments, one of the at least one inertial measurement component of the slave navigation device is embedded in the controller.

In some embodiments, a data communication between the inertia measurement component and the controller can be effected via a serial interface.

In some embodiments, the master navigation device can comprise a positioning component and a magnetic sensing component which are integrated in the same component.

In some embodiments, the slave navigation device can comprise N positioning components and N magnetic sensing components. In some embodiments, N components can be provided each of which integrates one positioning component and one magnetic sensing component in pairs, N being an integer of greater than or equal to 1.

In some embodiments, the system can further comprise a visual component which is connected to the controller.

In some embodiments, the visual component can be a monocular component or a binocular component.

In some embodiments, the system can further comprise a carrier signal differential component which is connected to the controller.

In some embodiments, the system can comprise at least two measurement components, In some embodiments, each one of the at least two measurement components comprises at least one sensor. In some embodiments, the at least one sensor in one of the at least two measurement components can provide a redundancy support for the at least one sensor in another one of the at least two measurement components.

A fifth aspect of the disclosure provides an unmanned aircraft. The unmanned aircraft can comprise the navigation system of an unmanned aircraft of the fourth aspect of the disclosure.

A sixth aspect of the disclosure provides a method for navigation of an unmanned aircraft. The method can comprise receiving, by a controller, data measured by each measurement component of the master navigation device and the slave navigation device; and effecting, by the controller, a navigation based upon the received data measured by each measurement component.

In some embodiments, the process of effecting, by the controller, a navigation based upon the received data measured by each measurement component can comprise analyzing, by the controller, a respective operation state of the measurement components of the same type based upon the data measured by each measurement component, and selecting, by the controller, a measurement component in an optimal operation state from among the measurement components of the same type and effecting a navigation using the data measured by the selected measurement component.

In some embodiments, the process of effecting, by the controller, a navigation based upon the received data measured by each measurement component can comprise analyzing, by the controller, a respective operation state of the measurement components of the same type based upon the data measured by each measurement component, and selecting, by the controller, a measurement component in a most stable operation state from among the measurement components of the same type and effecting a navigation using the data measured by the selected measurement component.

In some embodiments, the method can further comprise determining, by the controller, a failure in the measurement component based upon the data measured by the measurement component of the same type, and providing an alarm if the controller determining a failure in the measurement component.

In some embodiments, the process of determining, by the controller, a failure in the measurement component based upon the data measured by the measurement component of the same type can comprise determining, by the controller, whether a difference between data measured by one of the measurement components of the same type and data measured by others of the measurement components of the same type being greater than a preset threshold value, and determining, by the controller, that the one of the measurement components of the same type fails if the difference being greater than the preset threshold value.

In some embodiments, a data communication between the controller and the master navigation device and the slave navigation device can be effected via a serial communication bus.

In some embodiments, a data communication between the controller and the master navigation device and the slave navigation device can be effected via a CAN communication bus.

In some embodiments, the process of receiving, by a controller, data measured by each measurement component of the master navigation device and the slave navigation device can comprise receiving, by the controller, data measured by one inertia measurement component, one positioning component and one magnetic sensing component of the master navigation device, and data measured by two inertia measurement components, two positioning components and two magnetic sensing components in the slave navigation device.

In some embodiments, a data communication between the controller and the inertial measurement component can be effected via a serial interface.

It can be appreciated that, the technical solutions provided in the disclosure can be advantageous in various aspects.

The disclosure provides a redundant topological configuration to effect a redundant navigation. Various technical solutions are proposed on basis of the redundant topological configuration. The controller can effect a navigation using data from measurement devices in the redundant topological configuration. A more reliable data can be selected from the redundant data to effect the navigation, such that a precision in navigation can be improved. Therefore, a safety and reliability in a flight of the unmanned aircraft can be improved by using the navigation system.

However, the conventional navigation systems of unmanned aircraft effect the navigation using independent measurement components. The measurement components are generally micro-electromechanical devices. The micro-electromechanical devices have a low security level and are susceptible to a failure due to a material and an operation principle thereof. A failure in any one of the measurement components in the navigation system may adversely affect a navigation precision or even cause the unmanned aerial vehicle out of control.

With the navigation system having a redundant configuration of the disclosure, even when a measurement component fails, a redundant measurement component can be used to replace the failing measurement component, such that the navigation system can function. A situation where the unmanned aerial vehicle being out of control due to a failing navigation system can be avoided. A safety and a precision in navigation can be improved, and a more reliable navigation can be provided to the unmanned aircraft.

BRIEF DESCRIPTION OF THE DRAWINGS

Drawings of embodiments of the disclosure will be described for better understanding of the embodiments of the disclosure. It will be apparent that, the drawings merely illustrate exemplary embodiments of the disclosure. Those skilled in the art can conceive other drawings from the motivation of the illustrated drawings without inventive efforts.

DETAILED DESCRIPTION OF THE DISCLOSURE

A better understanding of the disclosure will be obtained by reference to the following detailed description that sets forth illustrative embodiments with reference to the drawings.

A configuration and a working principle of a navigation system of an unmanned aircraft in accordance with a first embodiment of a first aspect of the disclosure will be described.

Figure 1:
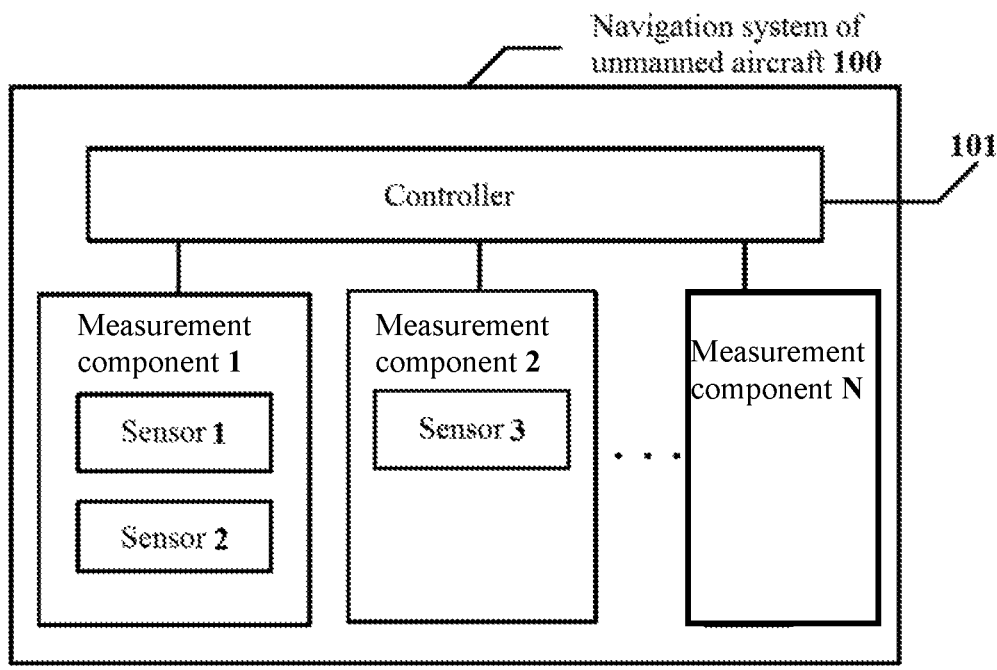
FIG. 1 shows a configuration of navigation system of an unmanned aircraft in accordance with a first embodiment of a first aspect of the disclosure.

FIG. 1 shows a configuration of navigation system of an unmanned aircraft in accordance with a first embodiment of a first aspect of the disclosure. As shown in FIG. 1, the navigation system 100 of the unmanned aircraft can comprise a controller 101 and at least one measurement component. For instance, as shown in FIG. 1, the at least one measurement component can comprise a measurement component 1, a measurement component 2, . . . , a measurement component N, where N can be an integer greater than or equal to 1. The controller can be connected to each one of the measurement component. The at least one measurement component can comprise redundant sensors. Data measured by the sensor can be transmitted to the controller.

In some instances, the navigation system can comprise one controller and one measurement component. The measurement component can comprise redundant sensors. A data communication with the controller can be effected using at least one serial communication interface to transmit the data measured by the sensor to the controller.

Optionally, the system can comprise one controller and at least two measurement components. At least one of the measurement components can comprise redundant sensors. For instance, as shown in FIG. 1, the measurement component 1 can comprise two sensors (e.g., sensor 1 and sensor 2) provided with in the same type, each one of the two sensors providing a redundancy support for one another. For another instance, the at least two measurement components can each comprise at least one sensor, and each one of the sensors in the at least two measurement components can provide a redundancy support for another one sensor in the at least two measurement components. In other words, the at least two measurement components can each comprise at least one sensor, and each one sensor can be a redundant sensor of another one sensor. For instance, as shown in FIG. 1, the sensors 1 and 2 in the measurement component 1 and the sensor 3 in the measurement component 2 can be provided in the same type. Each one of the sensors 1, 2 and 3 in the two measurement components can be a redundant sensor of another one sensor.

As shown in FIG. 1, the measurement component 1 can comprise two sensors (e.g., sensor 1 and sensor 2) provided in the same type, each one of the two sensors providing a redundancy support for one another. It will be appreciated that, the navigation system shown in FIG. 1 illustrates an example where two redundant sensors are provided; however, the number of the redundant sensors is not thus limited in the disclosure. For example, two or more redundant sensors can be provided. Exemplary embodiments where two redundant sensors are provided will be described in the following detailed description for conciseness.

In some instances, each one of the measurement components in the navigation system shown in FIG. 1 can be different in type from another. For instance, the measurement component 1 to N can be provided in different types from one another. The term "different type" can mean different functions of the measurement components and different physical characteristic of the measured data.

The navigation system provided in the disclosure can comprise redundant sensors. The redundant sensors can provide a redundant function support. For instance, when one sensor fails or provides an inaccurate measurement, the redundant sensor can be used to replace the failed sensor. Optionally, two measurement components can provide a redundancy support for each other. Therefore, a situation where the unmanned aerial vehicle being out of control due to a failing navigation system can be avoided. A safety and a precision in navigation can be improved, and a more reliable navigation can be provided to the unmanned aircraft.

The disclosure provides various implementations on basis of the configuration of the system shown in FIG. 1.

In some embodiments, a data communication between the at least one measurement component in the navigation system and the controller can be effected via a serial communication bus.

For instance, a data communication between the at least one measurement component and the controller can be effected via a Controller Area Network (CAN) communication bus. The CAN communication bus is advantageous in various aspects including easy expansion, good anti-interference performance, and independent CAN identifications (CAN IDs). The navigation system employing the CAN communication bus can thus be advantageous in various aspects including easy expansion, good anti-interference performance, and easy switching among components in the system using the CAN IDs.

The disclosure provides an inertial navigation system on basis of the configuration of FIG. 1. The inertial navigation system will be described with reference to FIG. 2.

Figure 2:
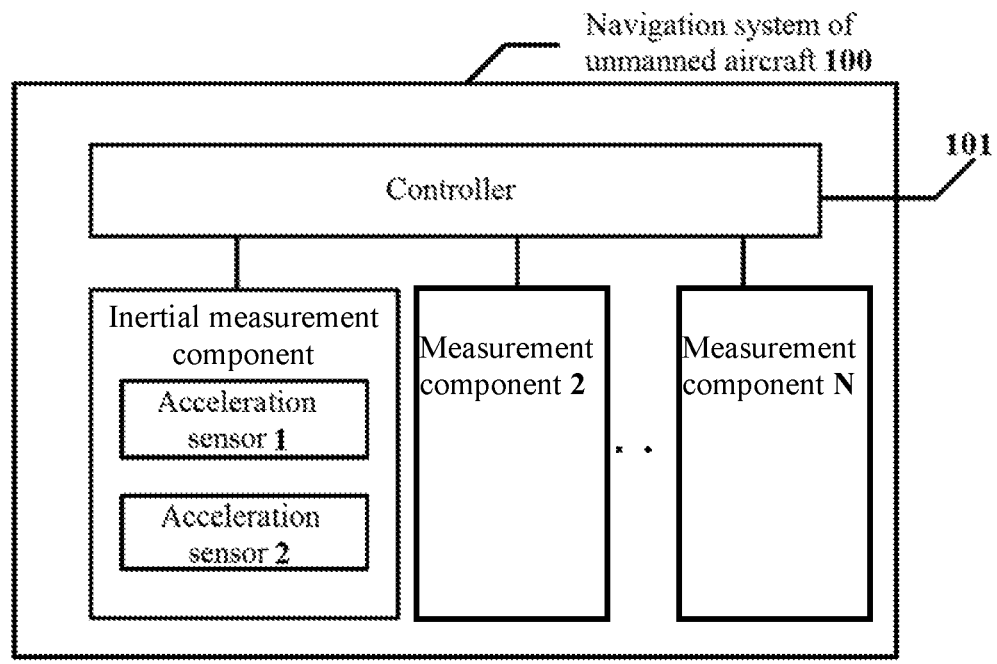
FIG. 2 shows a configuration of navigation system of an unmanned aircraft in accordance with a second embodiment of a first aspect of the disclosure.

FIG. 2 shows a configuration of navigation system of an unmanned aircraft in accordance with a second embodiment of a first aspect of the disclosure. As shown in FIG. 2, the navigation system can comprise a controller 101 and at least one measurement component, the controller being connected to each one of the at least one measurement component. The at least one measurement component can be an inertial measurement component.

In some instances, the inertial measurement component can comprise an acceleration sensor and/or a redundant gyro sensor.

Optionally, the inertia measurement component can comprise a redundant acceleration sensor and/or a redundant gyro sensor.

In some embodiments, as shown in FIG. 2, the measurement component 1 can be an inertial measurement component which comprise two redundant acceleration sensors such as an acceleration sensor 1 and an acceleration sensor 2.

It will be appreciated that, the configuration of the inertial measurement component shown in FIG. 2 is an exemplary configuration. The configuration of the inertial measurement component can be provided in various forms.

For instance, the inertia measurement component can comprise a redundant gyro sensor.

For instance, the inertia measurement component can comprise a redundant acceleration sensor and a redundant gyro sensor.

In some embodiments, the acceleration sensor can be a three-axis accelerometer. Alternatively, the acceleration sensor can include three single-axis accelerometers. The accelerometer can be used to detect an acceleration signal along three independent axes of an object under a carrier coordinate system. In some embodiments, the gyro sensor can be a three-axis gyro. Alternatively, the gyro sensor can include three single-axis gyros. The gyro can be used to detect an angular velocity signal of the carrier relative to the navigation coordinate system.

The conventional inertial measurement component can comprise an acceleration sensor and a gyro sensor. The disclosure provides a novel sensor configuration over the conventional configuration. In some embodiments, the inertial measurement component of the disclosure can comprise one acceleration sensor and redundant gyro sensors. Alternatively, the inertial measurement component of the disclosure can comprise redundant acceleration sensors and one gyro sensor.

In some instances, the inertial measurement component can be embedded in the controller.

In some instances, a data communication between the inertia measurement component and the controller can be effected via a serial interface.

In some instances, a data communication between the inertia measurement component and other measurement components in the system can be effected via a serial communication bus.

In some instances, a data communication between the inertia measurement component and other measurement components in the system can be effected via a CAN communication bus.

The navigation system shown in FIG. 2 can operate based on the inertial navigation principle. The navigation system can comprise at least an inertial navigation component. The inertial navigation component can comprise redundant acceleration sensors and/or redundant gyro sensors. The redundant configuration can further improve an operational performance of the inertial navigation component. A situation where the unmanned aerial vehicle being out of control due to a failing navigation system can be avoided. A safety and a precision in navigation can be improved, and a more reliable navigation can be provided to the unmanned aircraft.

The disclosure provides a satellite navigation system on basis of the configuration of FIG. 1. The position satellite navigation system will be described with reference to FIG. 3.

Figure 3:
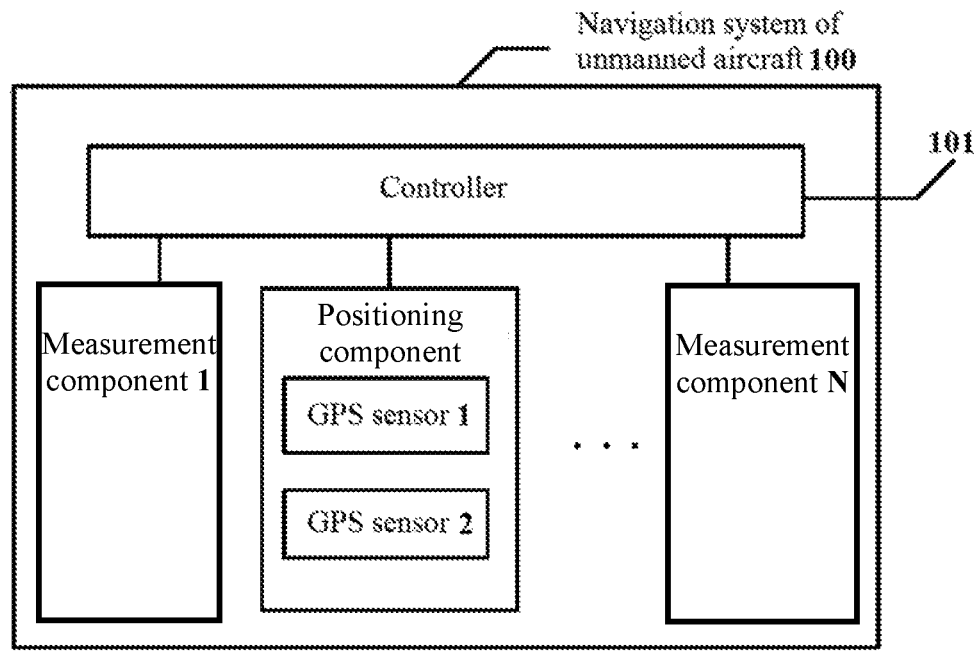
FIG. 3 shows a configuration of navigation system of an unmanned aircraft in accordance with a third embodiment of a first aspect of the disclosure.

FIG. 3 shows a configuration of navigation system of an unmanned aircraft in accordance with a third embodiment of a first aspect of the disclosure. As shown in FIG. 3, the navigation system can comprise a controller 101 and at least one measurement component, the controller being connected to each one of the at least one measurement component. The at least one measurement component can be a positioning component which is used to calculate a geographic position of the unmanned aircraft.

In some instances, the positioning component can comprise a positioning sensor.

In some instances, the positioning component can comprise redundant positioning sensors.

It will be appreciated that, the positioning component can be a component capable of positioning using a positioning system. For instance, the positioning system can be GPS (Global Positioning system), Chinese BeiDou system, or Galileo system. For instances, the positioning component can be a GPS component which measures a data using a GPS sensor. The GPS sensor can be a sensor which measures a position and a velocity of the carrier in real time by using GPS system. The GPS sensor can also be referred to a GPS receiver which receives a signal from GPS satellite via an antenna and outputs a current longitude, latitude and height information.

In some instances, the positioning sensor can comprise any one or a combination of a GPS sensor, a BeiDou positioning sensor, or a GLONASS positioning sensor.

The measurement component 2 as shown in FIG. 3 can be a positioning component which comprises two redundant GPS sensors (e.g., GPS sensor 1 and GPS sensor 2). The navigation system shown in FIG. 3 can operate based on the position satellite navigation principle. The navigation system can comprise at least a positioning component. The positioning component can comprise redundant positioning sensors. The redundant configuration can further improve an operational performance of the positioning component. A situation where the unmanned aerial vehicle being out of control due to a failing navigation system can be avoided. A safety and a precision in navigation can be improved, and a more reliable navigation can be provided to the unmanned aircraft.

The disclosure provides a Doppler navigation principle based navigation system on basis of the configuration of FIG. 1. The Doppler navigation principle based navigation system will be described with reference to FIG. 4.

Figure 4:
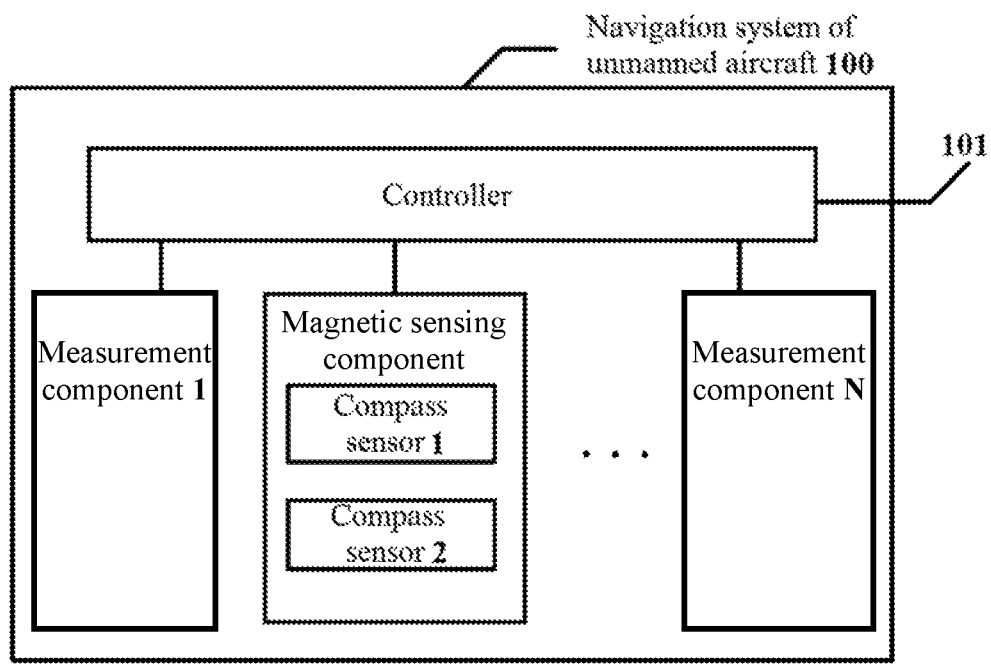
FIG. 4 shows a configuration of navigation system of an unmanned aircraft in accordance with a fourth embodiment of a first aspect of the disclosure.

FIG. 4 shows a configuration of navigation system of an unmanned aircraft in accordance with a fourth embodiment of a first aspect of the disclosure. As shown in FIG. 4, the navigation system can comprise a controller and at least one measurement component, the controller being connected to each one of the at least one measurement component. The at least one measurement component can be a magnetic sensing component which is used to sense a geomagnetic field to determine a direction.

In some instances, the magnetic sensing component can comprise a compass sensor.

In some instances, the magnetic sensing component can comprise redundant compass sensors.

The measurement component 3 shown in FIG. 4 can be a magnetic sensing component which comprising two redundant compass sensors (e.g., compass sensor 1 and compass sensor 2).

The navigation system shown in FIG. 4 can operate based on the Doppler navigation principle. The navigation system can comprise at least a magnetic sensing component. The magnetic sensing component can comprise redundant compass sensors. The redundant configuration can further improve an operational performance of the magnetic sensing component. A situation where the unmanned aerial vehicle being out of control due to a failing navigation system can be avoided. A safety and a precision in navigation can be improved, and a more reliable navigation can be provided to the unmanned aircraft.

It will be appreciated that, in the exemplary embodiments described hereinabove with reference to FIG. 2, FIG. 3 and FIG. 4, the measurement component 1 is provided as an inertial measurement component, the measurement component 2 is provided as a positioning component, and the measurement component 3 is provided as a magnetic sensing component, in order to discuss a difference between embodiments. Those skilled in the art will appreciate that, any one of the components in the system can be provided as an inertial measurement component, a positioning component or a magnetic sensing component.

The navigation systems described hereinabove with reference to FIG. 2, FIG. 3, and FIG. 4 can effect a navigation using a single navigation technology. The disclosure further provides a navigation system using multiple navigation technologies on basis of the configuration of FIG. 1. The navigation system employing multiple navigation technologies will be described with reference to FIG. 5.

Figure 5:
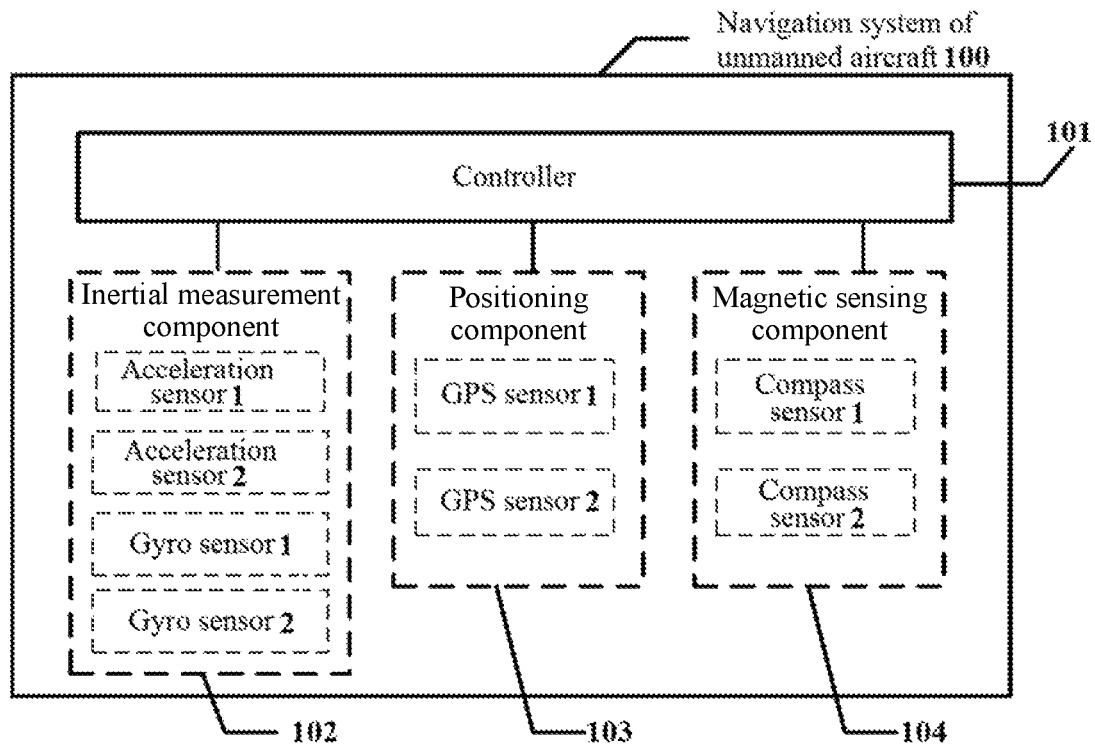
FIG. 5 shows a configuration of navigation system of an unmanned aircraft in accordance with a fifth embodiment of a first aspect of the disclosure.

FIG. 5 shows a configuration of navigation system of an unmanned aircraft in accordance with a fifth embodiment of a first aspect of the disclosure. As shown in FIG. 5, the navigation system can comprise a controller 101 and at least two measurement components, the controller being connected to each one of the at least two measurement components.

In some embodiments, the at least two measurement components can comprise a combination of any two or three components selected from a group consisting of an inertia measurement component, a positioning component, and a magnetic sensing component.

At least one component in the at least two measurement components can comprise redundant sensors. Data measured by the sensors can be provided to the controller.

For instance, the inertial measurement component can comprise an acceleration sensor and/or a gyro sensor. The inertial measurement component can be embedded in the controller. Additional or alternatively, the positioning component can comprise redundant positioning sensors. The positioning sensor can comprise any one or a combination of a GPS sensor or a BeiDou positioning sensor. Additional or alternatively, the magnetic sensing component can comprise redundant compass sensors.

In some instances, the system can further comprise a visual component. The visual device can be connected to the controller. The visual component can be a monocular component or a binocular component.

It will be appreciated that, the visual component can be used as a redundant component of the inertia measurement component. The visual component can operate instead of the inertia measurement component if the inertia measurement component fails, such that the controller can effect a navigation using data measured by the visual component to ensure an operation of the navigation system.

In some instances, the system can further comprise a carrier signal differential component which is connected to the controller.

It will be appreciated that, the carrier signal differential component can be used as a redundant component of the positioning component. The carrier signal differential component can operate instead of the positioning component if the positioning component fails, such that the controller can effect a navigation using data measured by the carrier signal differential component to ensure an operation of the navigation system.

The navigation system employing multiple navigation technologies as provided in the disclosure can take advantages of each one of the navigation technologies which can be complementary. A better navigation performance than that with a single navigation technique can be achieved. At least one of a plurality of measurement components can comprise a redundant configuration to improve an operational performance of the measurement component. A more reliable data can be provided to the navigation system, and a precision of navigation can be improved.

Figure 6:
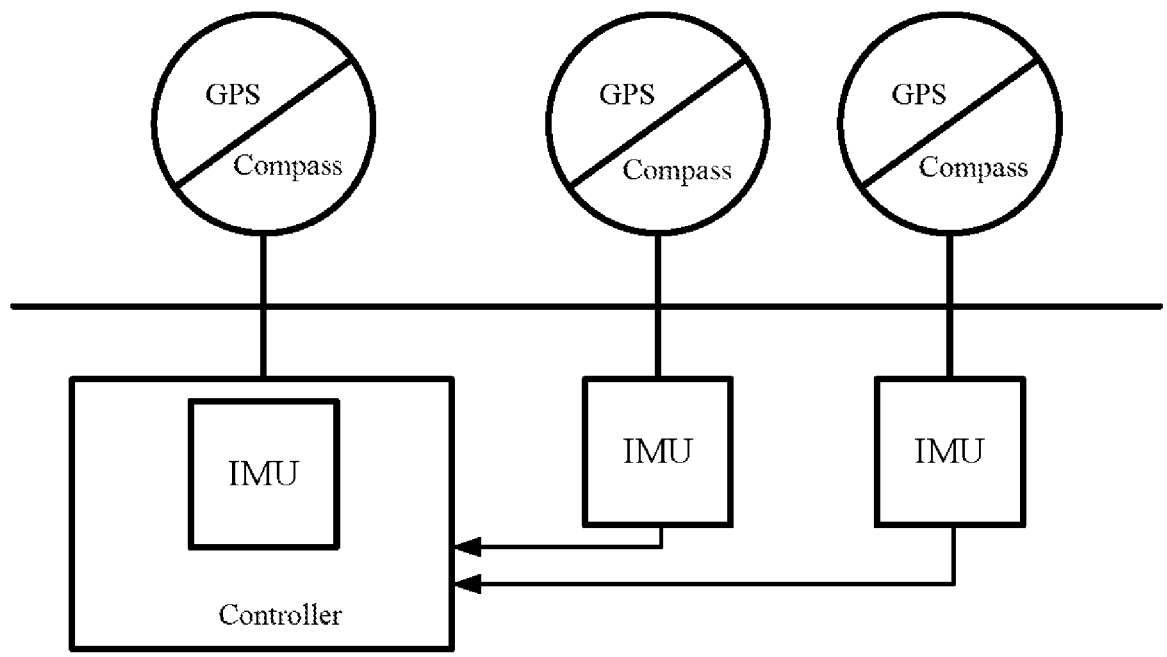
FIG. 6 shows a configuration of navigation system of an unmanned aircraft in accordance with a sixth embodiment of a first aspect of the disclosure.

A topological configuration of the navigation system in accordance with the first aspect of the disclosure will be described with reference to FIG. 6. FIG. 6 shows a configuration of navigation system of an unmanned aircraft in accordance with a sixth embodiment of a first aspect of the disclosure. As shown in FIG. 6, the system can comprise a controller 101, three GPSs, three compasses and three IMUs (Inertial Measurement Devices). One of the three IMUs can be embedded in the controller, and the other two IMUs can be respectively provided in different measurement components. Three components each integrating one GPS component and one compass component can be provided.

It will be appreciated that, FIG. 6 simply provides an exemplary configuration, without limiting to a configuration of the measurement component in the navigation system. For instances, IMU may not be embedded in the controller but can be independently provided in a measurement component. In some instances, each of the IMUs can be respectively provided in different measurement components. Optionally, one or more IMUs can be integrated in the one measurement component.

In case each of the IMUs being respectively provided in different measurement components, each one of the measurement components can provide a redundancy support for one another. In case a plurality of IMUs being integrated in one measurement component, each one of the plurality of IMUs in the measurement component can provide a redundancy support for one another.

In some instances, the three integrated GPSs/compasses can be respectively provided in different measurement components. Optionally, the three integrated GPSs/compasses can be integrated in one measurement component. In some instance, the GPS and the compass can be respectively provided in different measurement components rather than being integrated in the same component.

Figure 7:
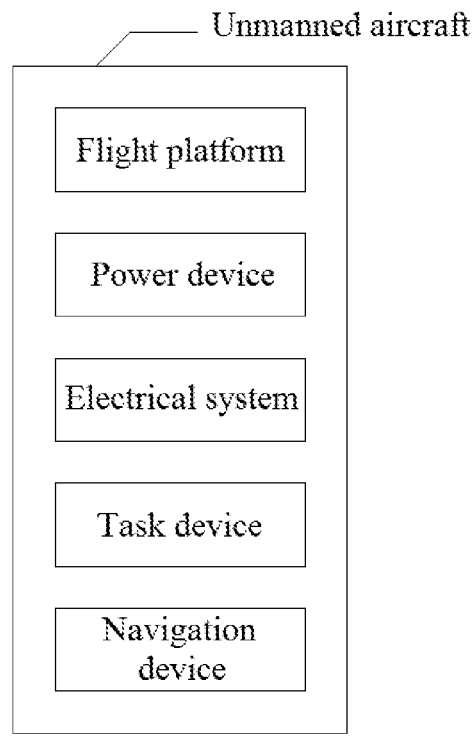
FIG. 7 shows a configuration of an unmanned aircraft in accordance with a second aspect of the disclosure.

The disclosure provides an unmanned aircraft on basis of the navigation system in accordance with the first aspect of the disclosure, the unmanned aircraft being provided with the navigation system in accordance with the first aspect of the disclosure. FIG. 7 shows a configuration of an unmanned aircraft. As shown in FIG. 7, the unmanned aircraft can comprise a flight platform, a power device, an electrical system, a task device and a navigation device provided in accordance with the fourth aspect as described hereinabove. A configuration of the navigation system is described with reference to FIG. 1 to FIG. 6 hereinabove, and a detailed description is omitted for conciseness.

The disclosure provides a method for navigation on basis of the navigation system provided in accordance with the first aspect of the disclosure. The method for navigation will be described with reference to the flowchart of FIG. 8.

Figure 8:
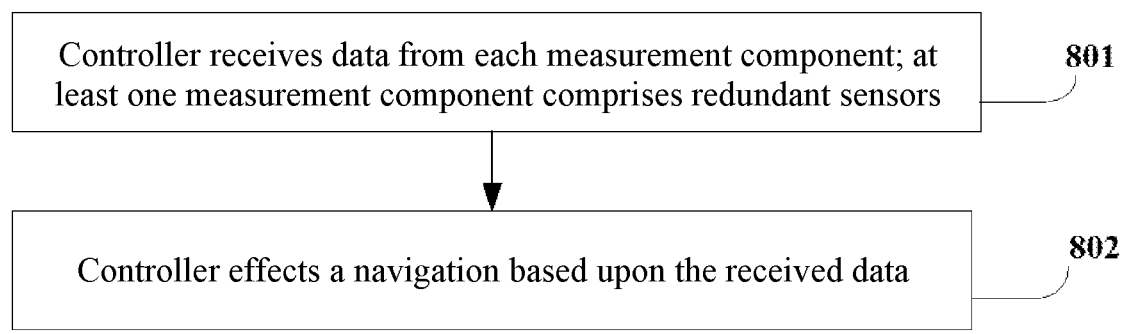
FIG. 8 shows a flowchart of a method for navigation of an unmanned aircraft in accordance with a third aspect of the disclosure.

FIG. 8 shows a flowchart of a method for navigation of an unmanned aircraft in accordance with a third aspect of the disclosure. The method can comprise steps 801 and 802.

In step 801, the controller can receive data from each measurement component. In some instances, at least one measurement component can comprise redundant sensors. Data from the measurement component can comprise data measured by each one of the sensors or data measured by one of the sensors;

In step 802, the controller can effect a navigation based upon the received data.

The step 802 can be implemented in various manners if the data from the at least one measurement component comprises data measured by each one of the sensors.

In some embodiments, the controller can be configured to select data measured by a sensor, which is in an optimal operation state, from among the data received from the at least one measurement component, and effect a navigation using the selected data and data from other measurement component(s).

Alternatively, the controller can be configured to select data measured by a sensor, which is in a stable operation state, from among the data received from the measurement component having redundant sensors, and effect a navigation using the selected data and data from other measurement component(s).

In some embodiments, the data received from the at least one measurement component can comprise data measured by a sensor in an optimal operation state, or data measured by a sensor in a most stable operation state. In this case, the step 702 can comprise a steps in which the controller effects a navigation based upon data from each measurement component.

In some embodiments, a data communication between the controller and the measurement component can be effected via a serial communication bus.

In some embodiments, a data communication between the controller and the measurement component can be effected via a CAN communication bus.

In some embodiments, the controller can receive data from an inertial measurement component and effect a navigation using the data received from the inertia measurement component.

In some embodiments, the inertia measurement component can comprise an acceleration sensor and/or a gyro sensor.

In some embodiments, a data communication between the controller and the inertia measurement component can be effected via a serial interface.

In some embodiments, the controller can receive data from a positioning component and effect a navigation using the data received from the positioning component.

In some embodiments, the positioning component can comprise a positioning sensor.

In some embodiments, the positioning sensor can comprise any one or a combination of a GPS sensor or a BeiDou positioning sensor.

In some embodiments, the controller can receive data from a magnetic sensing component and effect a navigation using the data received from the magnetic sensing component.

In some embodiments, the magnetic sensing component can comprise a compass sensor In some embodiments, the controller can receive data from a visual component and effect a navigation using the data received from the visual component.

In some embodiments, the visual component can comprise a monocular component or a binocular component.

In some embodiments, the controller can receive data from a carrier signal differential component and effect a navigation using the data received from the carrier signal differential component.

With the method for navigation of the disclosure, the controller can receive data from each measurement component in the navigation system and effect a navigation using the received data. At least one measurement component can comprise redundant sensors, and the redundant sensors can provide an accurate and reliable data to the controller. Therefore, the controller can be capable of providing a reliable navigation information to the unmanned aircraft.

The first, second and third aspects of the disclosure are described hereinabove. The fourth, fifth and sixth aspects of the disclosure will be described.

Figure 9:
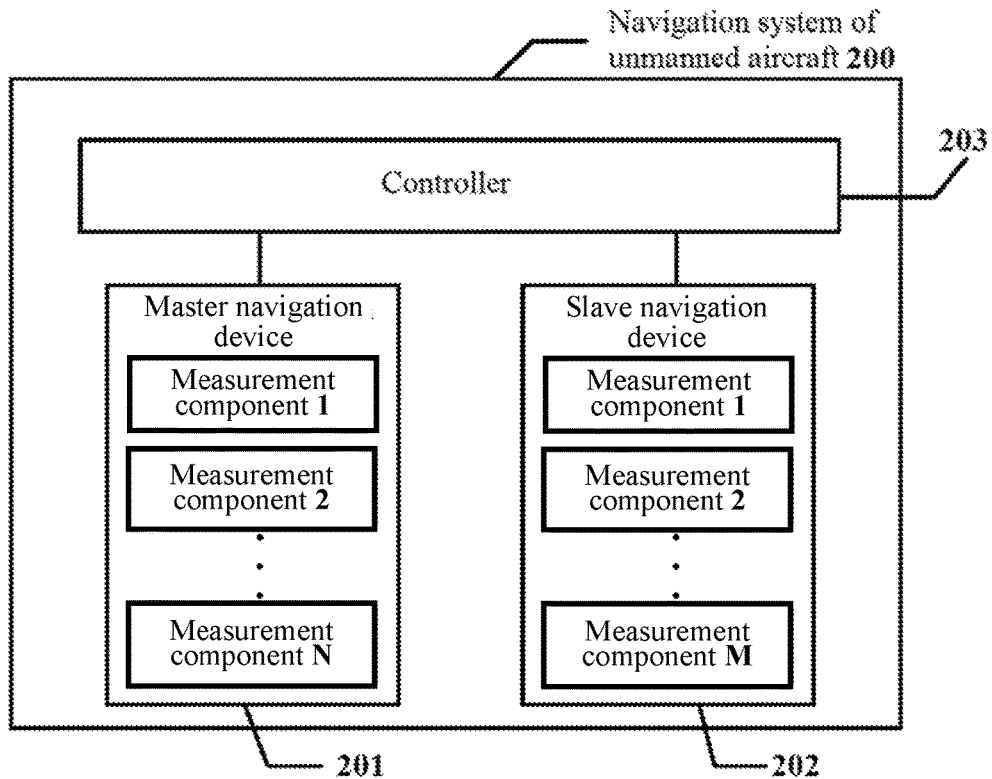
FIG. 9 shows a configuration of navigation system of an unmanned aircraft in accordance with a first embodiment of a fourth aspect of the disclosure.

FIG. 9 shows a configuration of navigation system of an unmanned aircraft in accordance with a first embodiment of a fourth aspect of the disclosure. As shown in FIG. 9, the navigation system of the unmanned aircraft 200 can comprise a master navigation device 201, a slave navigation device 202 and a controller 203.

The master navigation device can comprise at least one measurement component (e.g., measurement components 1 to N as shown in FIG. 9, where N being greater than or equal to 1).

The slave navigation device can comprise at least one measurement component (measurement components 1 to M as shown in FIG. 9, where M being greater than or equal to 1). At least one measurement component of the slave navigation device can provide a redundancy support for at least one measurement component of the master navigation device.

The controller can effect a navigation using the measurement component of the master navigation device and the measurement component of the slave navigation device which provides a redundancy support for the measurement component of the master navigation device.

It will be appreciated that, an internal configuration of the slave navigation device can depend on an internal configuration of the master navigation device. The measurement component of the slave navigation device can provide a redundancy support for the measurement component in master navigation device. A type of the measurement component of the slave navigation device can be the same as a type of at least one measurement component of the master navigation device. However, the number of the measurements component of the slave navigation device can be determined as required, and can be not limited by the configuration of the master navigation device. In other words, the number of the components in the slave navigation device can be irrelevant to the number of the components in the master navigation device. For example the value N can be irrelevant to the value M.

In some embodiments, a data communication between the measurement component of the master navigation device and the measurement component of the slave navigation device and the controller can be effected via a serial communication bus.

In some embodiments, a data communication between the measurement component of the master navigation device and the measurement component of the slave navigation device and the controller can be effected via a CAN communication bus.

In some embodiments, the controller can be configured to select one measurement component with respect to each type of measurement component from the master navigation device and the slave navigation device to effect a navigation.

In some embodiments, the controller can be configured to select one measurement component in an optimal operation state with respect to each type of measurement component from the master navigation device and the slave navigation device to effect a navigation.

In some embodiments, the controller can be configured to select one measurement component in a most stable operation state with respect to each type of measurement component from the master navigation device and the slave navigation device to effect a navigation.

Figure 10:
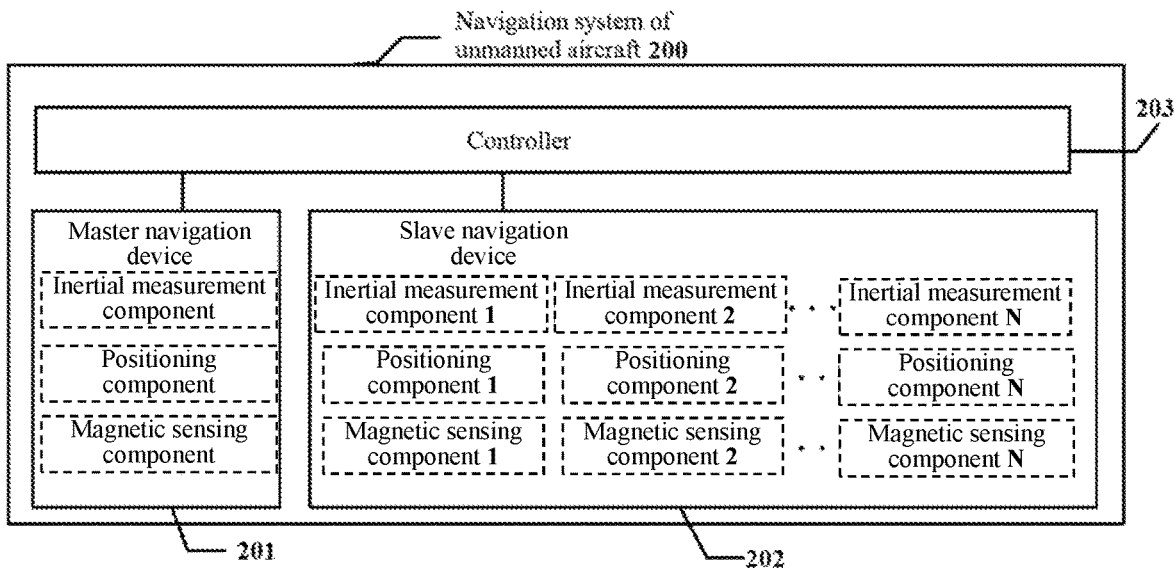
FIG. 10 shows a configuration of navigation system of an unmanned aircraft in accordance with a second embodiment of a fourth aspect of the disclosure.

The disclosure provides an alternative configuration on basis of the navigation system shown in FIG. 9 by analyzing the single navigation technology and multiple navigation technologies. FIG. 10 shows a configuration of navigation system of an unmanned aircraft in accordance with a second embodiment of a fourth aspect of the disclosure. As shown in FIG. 10, the system can comprise a master navigation device, a slave navigation device and a controller. The master navigation device can comprise an inertial measurement component, a positioning component, a magnetic sensing component or a combination thereof. The slave navigation device can comprise at least one inertial measurement component, at least one positioning component, at least one magnetic sensing component or a combination thereof.

The positioning component can be a component capable of positioning using a positioning system. For instance, the positioning system can be GPS (Global Positioning system), Chinese BeiDou system, or Galileo system. For instances, the positioning component can be a GPS component which measures a data using a GPS sensor. The GPS sensor can be a sensor which measures a position and a velocity of the carrier in real time by using GPS system. The GPS sensor can also be referred to a GPS receiver which receives a signal from GPS satellite via an antenna and outputs a current longitude, latitude and height information.

In some instances, the magnetic sensing component can be a compass component.

In some instances, the measurement component of the slave navigation device can be the same as the measurement component of the master navigation device if the master navigation device comprises one measurement component, the measurement component of the slave navigation device providing a redundancy support for the measurement component of the master navigation device. In this case, the navigation system can be a navigation system using a single navigation technology. With this navigation system, advantages of single navigation technology can be gained, and a reliability of the system can be improved by the redundant configuration in the master device and the slave device, thus improving a performance in navigation.

Figure 11:
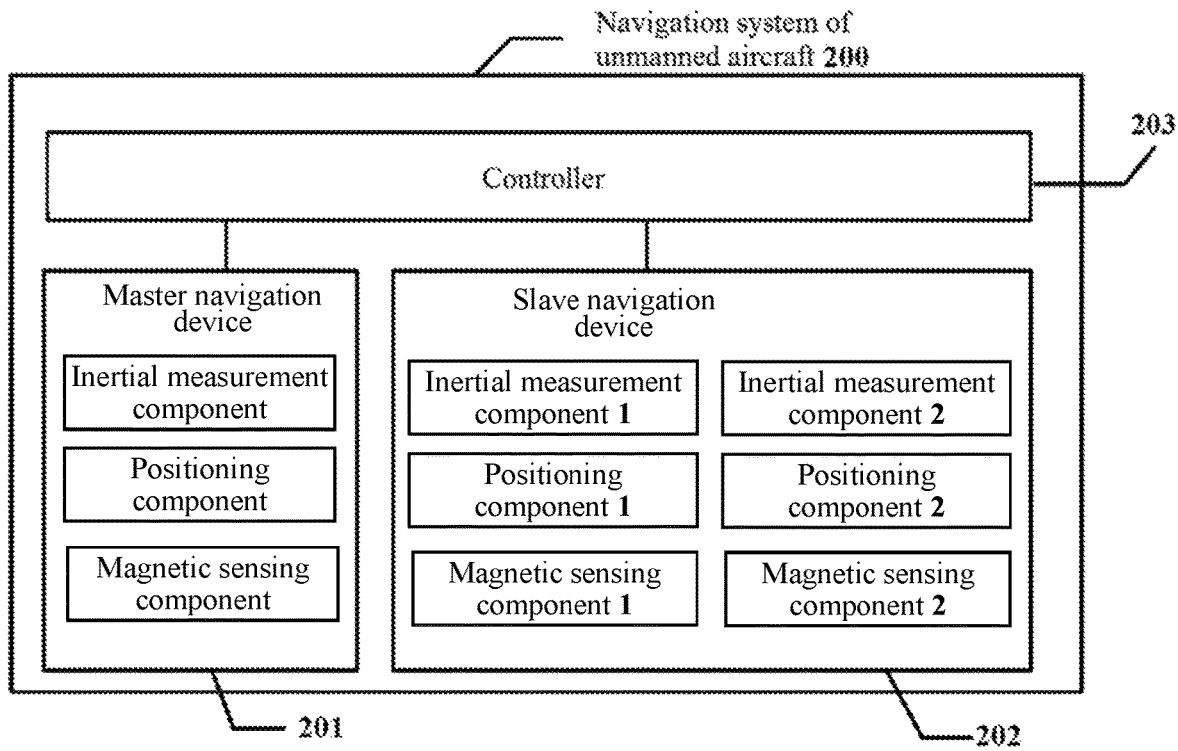
FIG. 11 shows a configuration of navigation system of an unmanned aircraft in accordance with a third embodiment of a fourth aspect of the disclosure.

The disclosure provides an alternative configuration of a navigation system using multiple navigation technologies on basis of the navigation system shown in FIG. 10. FIG. 11 shows a configuration of navigation system of an unmanned aircraft in accordance with a third embodiment of a fourth aspect of the disclosure. As shown in FIG. 11, the system can comprise a master navigation device, a slave navigation device, and a controller. The master navigation device can comprise one inertial measurement component, one positioning component and one magnetic sensing component. The slave navigation device can comprise two inertia measurement components, two positioning components and two magnetic sensing components.

It will be appreciated from the navigation system shown in FIG. 11 that, three groups of redundant navigation components can be provided by the redundant configuration in the master navigation device and the slave navigation device. With this configuration, a performance of the navigation system can be improved, and a configuration of the navigation system can be simplified for easy implementation.

Figure 12:
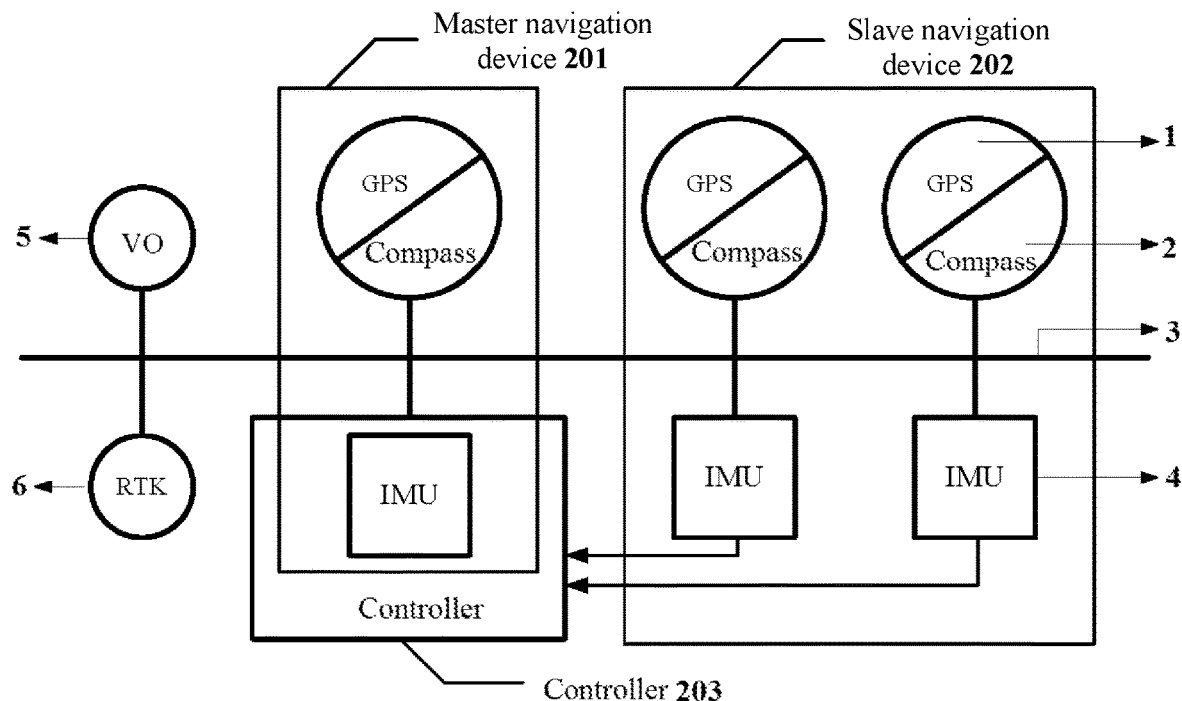
FIG. 12 shows a configuration of navigation system of an unmanned aircraft in accordance with a fourth embodiment of a fourth aspect of the disclosure.

The disclosure provides alternative configurations on basis of the navigation system shown in FIG. 11 to simplify a configuration of the system and reduce a cost of the system. The alternatively configurations will be described with reference to FIG. 12, which shows a redundant topological configuration of a navigation system. In FIG. 12, a GPS component and a compass component are used as examples of the positioning component and the magnetic sensing component respectively. It will be appreciated that, various other components can be alternatively used.

In FIG. 12, a GPS component is referred to as 1, a compass component is referred to as 2, a CAN bus is referred to as 3, an IMU (Inertial Measurement Unit) is referred to as 4, a VO (monocular) component is referred to as 5, and a RTK (carrier signal differential component) component is referred to as 6.

As show in FIG. 11, the master navigation device can comprise an inertial measurement component. The inertial measurement component can be embedded in the controller. With this configuration, the navigation system can be compatible with chips in existing navigation system, such that the navigation system of the disclosure has a low production cost and a high production efficiency. In addition, an integrated space can be reduced and a configuration of the navigation system can be simplified.

In some embodiments, the slave navigation device can comprise at least one inertial measurement component. Any one of the inertial measurement components in the slave navigation device can be embedded in the controller.

Considering that the slave navigation device can also comprise an inertia measurement component, any one of the inertia measurement component of the master navigation device or the inertia measurement component of the slave navigation device can be embedded in the controller. The navigation system of this configuration can be compatible with chips in existing navigation system, such that the navigation system of the disclosure has a low production cost and a high production efficiency. In addition, an integrated space can be reduced and a configuration of the navigation system can be simplified.

In some embodiments, a data communication between the inertia measurement component and the controller can be effected via a serial interface. In this navigation system, the GPS component and the compass component of the master navigation device can be provided as separate components. However, for purpose of a reasonable configuration layout of the of the navigation system, the GPS component and the compass component of the master navigation device can be integrated in one component. It will be appreciated that, in case the slave navigation device comprises a GPS component and a compass component, the GPS component and the compass component of the slave navigation device can also be integrated in one component.

In some embodiments, when the master navigation device comprises a GPS component and a compass component, the GPS component and the compass component can be integrated in one component. As shown in FIG. 12, the GPS component and the compass component of the master navigation device can be integrated in the same component.

In some embodiments, when the slave navigation device comprises N GPS components and N compass components, N components can be provided each of which integrates one GPS component and one compass component of the slave navigation device in pairs, N being an integer of greater than or equal to 1. As shown in FIG. 12, one GPS component and one compass component of the slave navigation device can be integrated in the same component in pairs.

In some embodiments, the system can further comprise a visual component which is connected to the controller.

In some embodiments, the visual component can be a monocular component or a binocular component.

In some embodiments, the system can further comprise a carrier signal differential component which is connected to the controller.

Figure 13:
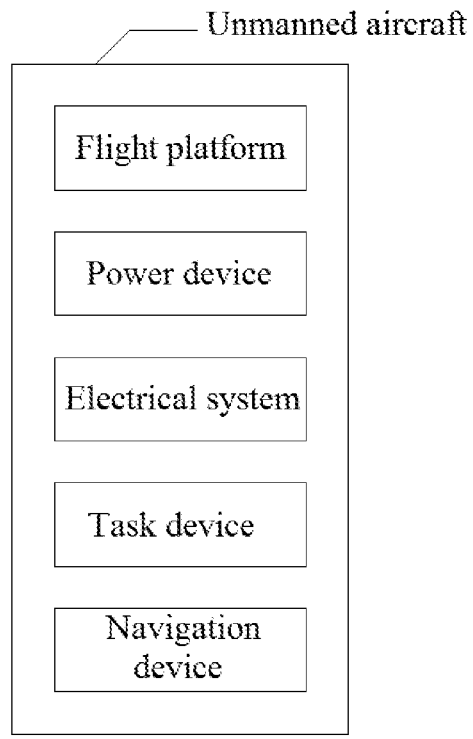
FIG. 13 shows a configuration of an unmanned aircraft in accordance with a fifth aspect of the disclosure.

The disclosure further provides an unmanned aircraft on basis of the navigation system provided in accordance with the fourth aspect of the disclosure. The unmanned aircraft can be provided with the navigation system provided in accordance with the fourth aspect of the disclosure as described hereinabove. FIG. 13 shows a configuration of the unmanned aircraft. As shown in FIG. 13, the unmanned aircraft can comprise a flight platform, a power device, an electrical system, a task device and a navigation device provided in accordance with the fourth aspect of the disclosure. A configuration of the navigation system is described with reference to FIG. 9 to FIG. 12 hereinabove, and a detailed description is omitted for conciseness.

The disclosure also provides a method for navigation on basis of the navigation system provided in accordance with the fourth aspect of the disclosure. The method will be described with reference to the flowchart of FIG. 14.

Figure 14:
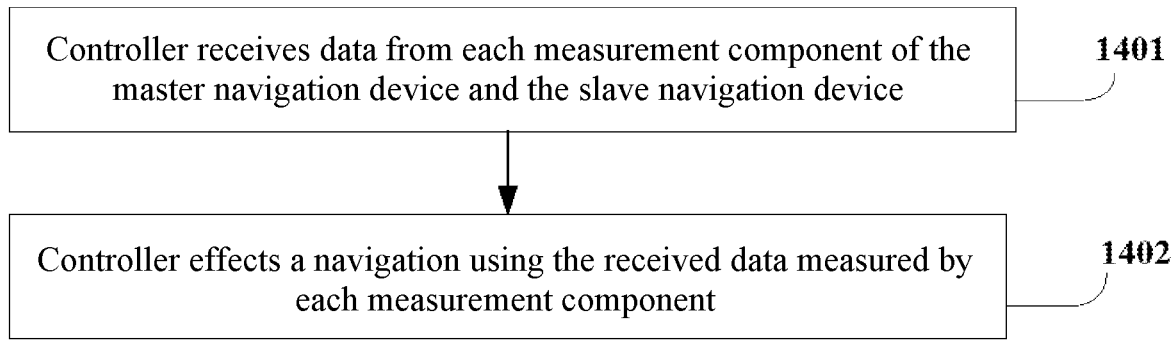
FIG. 14 shows a flowchart of a method for navigation of an unmanned aircraft in accordance with a sixth aspect of the disclosure.

FIG. 14 shows a flowchart of a method for navigation of an unmanned aircraft in accordance with a sixth aspect of the disclosure. The method can comprise steps 1401 and 1402.

In step 1401, the controller can receive data measured by each measurement component of the master navigation device and the slave navigation device.

In step 1402, the controller can effect a navigation using the received data measured by each measurement component.

In some embodiments, the step where the controller effects a navigation using the received data measured by each measurement component can comprise analyzing, by the controller, a respective operation state of the measurement components of the same type based upon the data measured by each measurement component, and selecting, by the controller, a measurement component in an optimal operation state from among the measurement components of the same type and effecting a navigation using the data measured by the selected measurement component.

In some embodiments, the step where the controller effects a navigation using the received data measured by each measurement component can comprise analyzing, by the controller, a respective operation state of the measurement components of the same type based upon the data measured by each measurement component, and selecting, by the controller, a measurement component in a most stable operation state from among the measurement components of the same type and effecting a navigation using the data measured by the selected measurement component.

In some embodiments, the method can further comprise determining, by the controller, a failure in the measurement component based upon the data measured by the measurement component of the same type, and providing an alarm if the controller determining a failure in the measurement component.

In some embodiments, the step of determining, by the controller, a failure in the measurement component based upon the data measured by the measurement component of the same type can comprise determining, by the controller, whether a difference between data measured by one of the measurement components of the same type and data measured by others of the measurement components of the same type being greater than a preset threshold value, and determining, by the controller, that the one measurement component fails if the difference being greater than the preset threshold value.

In some embodiments, a data communication between the controller and the master navigation device and the slave navigation device can be effected via a serial communication bus.

In some embodiments, a data communication between the controller and the master navigation device and the slave navigation device can be effected via a CAN communication bus.

In some embodiments, the step where the controller receiving data measured by each measurement component from the master navigation device and the slave navigation device can comprise receiving, by the controller, data measured by one inertia measurement component, one positioning component and one magnetic sensing component of the master navigation device, and data measured by two inertia measurement components, two positioning components and two magnetic sensing components in the slave navigation device.

In some embodiments, a data communication between the controller and the inertia measurement component can be effected via a serial interface.

With the method for navigation of the disclosure, the controller can receive data from the master navigation device and the slave navigation device in the navigation system. The measurement component of the slave navigation device can provide a redundancy support for the measurement component of the master navigation device, therefore, the slave navigation device can ensure a correct data transmission and provide an effective measurement data to the controller even if the measurement component of the master navigation device fails or a measurement data thereof not accurate. The controller can effect a navigation using the received data and provide a reliable navigation information to the unmanned aircraft.

Those skilled in the art will appreciate that, some or all steps of the method as provided in embodiments of the disclosure can be implemented using a software executing on an universal hardware platform. With this understanding, essentially the technical solution of the disclosure may be embodied as a software product. The computer software product can be stored in a storage medium (e.g., ROM/RAM, a diskette, or an optical disk) and includes several instructions for causing a computer device to execute some or all steps of the method according to the various embodiments of the disclosure. The computer device can be a personal computer, a server or a network communication device such as a media gateway.

It will be appreciated that, embodiment as described hereinabove can be provided in a progressive manner. The description of respective embodiment may emphasize a difference of the embodiment over others, a reference to other embodiments can be made for those same or similar components. A description of device and system embodiments can be simplified in view of a similarity with method embodiments, and a reference to description of the method embodiments can be made. The device and system embodiments described hereinabove can be merely illustrative. The units illustrated as separate parts may or may not be physically separated. The parts shown as units may or may not be physical units. For example, the parts can be provided at the same location or distributed over a plurality of network units. All or part of the components can be selected to implement the embodiments of the disclosure according to actual requirements. Those skilled in the art can appreciate and implement the disclosure without inventive efforts.

The embodiments as described hereinabove can be intended to merely illustrate rather than limit the patent scope of the disclosure. Numerous variations, equivalents and improvements made in light of the spirit of the disclosure can be within the scope of the disclosure.

What is claimed is:

1. An unmanned aircraft navigation system comprising:
a master navigation device including at least one measurement component having one type of sensing components;
a slave navigation device including at least one measurement component including the same type of sensing components, wherein the slave navigation device is configured to provide a redundancy support for the at least one measurement component of the master navigation device; and
a controller configured to effectuate a navigation using the same type of sensing components from the at least one measurement component of the master navigation device and the at least one measurement component of the slave navigation device.

2. The system of claim 1, wherein the at least one measurement component of the master navigation device and the at least one measurement component of the slave navigation device are configured to communicate with the controller via a serial communication bus.

3. The system of claim 1, wherein the at least one measurement component of the master navigation device and the at least one measurement component of the slave navigation device are configured to communicate with the controller a Controller Area Network (CAN) communication bus.

4. The system of claim 1, wherein the controller is further configured to select one measurement component with respect to each type of measurement component from the master navigation device and the slave navigation device to effectuate a navigation.

5. The system of claim 4, wherein the selected one measurement component is in an optimal operation state with respect to the corresponding type of measurement component from the master navigation device and the slave navigation device.

6. The system of claim 4, wherein the selected one measurement component in a most stable operation state with respect to the corresponding type of measurement component from the master navigation device and the slave navigation device.

7. The system of claim 1, wherein:
the master navigation device includes one inertial measurement component, one positioning component, one magnetic sensing component, or a combination thereof; and
the slave navigation device includes at least one inertial measurement components, at least one positioning components, at least one magnetic sensing components, or a combination thereof.

8. The system of claim 1, wherein the master navigation device includes an inertial measurement component embedded in the controller.

9. The system of claim 1, wherein the slave navigation device includes at least one inertial measurement component, one of the at least one inertial measurement component of the slave navigation device being embedded in the controller.

10. The system of claim 1, wherein the master navigation device includes a positioning component and a magnetic sensing component integrated in a same component.

11. The system of claim 10, wherein:
the slave navigation device includes N positioning components and N magnetic sensing components, N being an integer greater than or equal to 1; and
each of the N positioning components and a corresponding one of the N magnetic sensing components are integrated as one pair in a same component.

12. The system of claim 1, further comprising:
a visual component connected to the controller.

13. The system of claim 1, further comprising:
a carrier signal differential component connected to the controller.

14. An unmanned aircraft comprising:
a navigation system comprising:
a master navigation device including at least one measurement component having one type of sensing components;
a slave navigation device including at least one measurement component including the same type of sensing components, wherein the slave navigation device is configured to provide a redundancy support for the at least one measurement component of the master navigation device, and
a controller configured to effectuate a navigation using the same type of sensing components from the at least one measurement component of the master navigation device and the at least one measurement component of the slave navigation device.

15. A method for navigating an unmanned aircraft comprising: receiving, by a controller, data measured by a same type of sensing components of measurement components of a master navigation device and a slave navigation device; providing a redundancy support for the master navigation device by the data measured by the same type of sensing components of the slave navigation device: and effectuating, by the controller, a navigation based upon the received data.

16. The method of claim 15, wherein effectuating the navigation includes:
analyzing, by the controller, respective operation states of the measurement components of a same type based upon the data; and
selecting, by the controller, a measurement component in an optimal operation state from among the measurement components of the same type and effectuating the navigation using the data measured by the selected measurement component.

17. The method of claim 15, wherein effectuating the navigation includes:
analyzing, by the controller, respective operation states of the measurement components of a same type based upon the data; and
selecting, by the controller, a measurement component in a most stable operation state from among the measurement components of the same type and effectuating the navigation using the data measured by the selected measurement component.

18. The method of claim 15, further comprising:
determining, by the controller, whether a failure occurs in the measurement components based upon the data measured by the measurement components of a same type; and
triggering an alarm if the controller determines that the failure occurs.

19. The method of claim 18, wherein determining whether the failure occurs includes:
determining, by the controller, whether a difference between data measured by one of the measurement components of the same type and data measured by another one or more of the measurement components of the same type is greater than a preset threshold value; and determining, by the controller, that the one of the measurement components of the same type fails if the difference is greater than the preset threshold value.

20. The method of claim 15, wherein the controller communicates with the master navigation device and the slave navigation device via a serial communication bus.

* * * * *